(12) United States Patent
Schmidt et al.

(10) Patent No.: US 7,130,343 B2
(45) Date of Patent: Oct. 31, 2006

(54) INTERFERENCE REDUCTION IN CCK MODULATED SIGNALS

(75) Inventors: Michael Schmidt, Dresden (DE); Eric Sachse, Dresden (DE); Uwe Eckhardt, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 772 days.

(21) Appl. No.: 10/259,711

(22) Filed: Sep. 27, 2002

(65) Prior Publication Data
US 2003/0161421 A1   Aug. 28, 2003

(30) Foreign Application Priority Data
Feb. 27, 2002  (DE)  .................. 102 08 416

(51) Int. Cl.
*H03H 7/40* (2006.01)
*H03D 1/04* (2006.01)

(52) U.S. Cl. ...................... 375/233; 375/346
(58) Field of Classification Search ................ 375/316, 375/340, 343, 346, 233, 234, 232, 230, 229
See application file for complete search history.

(56) References Cited

U.S. PATENT DOCUMENTS 6,233,273 B1 * 5/2001 Webster et al. ............. 375/148
6,563,858 B1 * 5/2003 Fakatselis et al. .......... 375/148
6,678,310 B1 * 1/2004 Andren et al. .............. 375/147
2003/0123585 A1 * 7/2003 Yen ............................ 375/350

FOREIGN PATENT DOCUMENTS

WO     00/72540 A1    11/2000

OTHER PUBLICATIONS

Andren et al., "CCK Modulation Delivers 11 Mbps for high Rate IEEE 802.11 Extension", Wireless Symposium/Portable by Design Conference, Spring 1999, pp. 1-10.*
Weiss et al., "A Fractionally Spaced DFE with Subband Decorrelation", Conference on Signals, Systems and Computers, 2000. Conference Record of the Thirty-Fourth Asilomar. vol. 2, Oct. 29-Nov. 1, 2000,pp. 1767-1771, vol. 2.*
English translation of Official Communication in German application No. 102 08 416.5-31 issued Feb. 10, 2005.

* cited by examiner

*Primary Examiner*—Temesghen Ghebretinsae
*Assistant Examiner*—Vineeta Panwalkar
(74) *Attorney, Agent, or Firm*—Meyertons Hood Kivlin Kowert & Goetzel, P.C.; B. Noël Kivlin

(57) ABSTRACT

A wireless local area network receiver is provided that has an interference reduction unit for reducing interchip interference in a received signal that is modulated using a complementary code keying technique such as CCK-11. The interference reduction unit comprises a decision feedback equalizer that has a feedforward filter for reducing precursor interference and a feedback filter for reducing postcursor interference in the received signal. The receiver may perform channel estimation to optimize the filter coefficients during the preambles of the incoming sequence.

53 Claims, 3 Drawing Sheets

INTERFERENCE REDUCTION IN CCK MODULATED SIGNALS

BACKGROUND OF THE INVENTION

1. Field of the Invention

The invention generally relates to apparatus and method for reducing interference in modulated signals received in a communications systems, and in particular to complementary code keying modulation techniques in WLAN (Wireless Local Area Network) systems.

2. Description of the Related Art

A wireless local area network is a flexible data communications system implemented as an extension to or as an alternative for, a wired LAN. Using radio frequency or infrared technology, wireless LANs transmit and receive data over the air, minimizing the need for wired connections. Thus, wireless LANs combine data connectivity with user mobility.

Most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to the 802.11b standard that allows data rates of 5.5 and 11 Mbps in the 2.4 GHz spectrum. This extension is backwards compatible as far as it relates to direct sequence spread spectrum technology, but it adopts a new modulation technique called CCK (Complementary Code Keying) which allows the speed increase.

The CCK modulation can generally be described as a modification of MOK (M-ary Orthogonal Keying) modulation using codes of complex symbol structure. The CCK technology allows for multi-channel operation and employs the same chip rate and spectrum shape as the 802.11 Barker code spread functions. CCK can be considered as a form of M-ary code word modulation where one of M unique signal codewords is chose for transmission.

Referring now to FIG. 1 which illustrates a block diagram of a conventional CCK modulator, a multiplexer 100 receives scrambled data and multiplexes the input data either to the code selector 110 or to the modulator 120. The multiplexer 100 gets clocked at the symbol rate. The code selector 110 selects one of 64 complex codes to be fed to the modulator 120. The bits that the modulator 120 receives from the multiplexer 100 are used to QPSK (Quadrature Phase Shift Keying) modulate the codeword. The outputs of the modulator 120 are I and Q outputs to generate complex codes.

In particular the 802.11b CCK-11 (Complementary Code Keying at 11 Mbps) modulation is subject to multipath propagation. While (direct sequence) spread spectrum systems are usually designed to cope with multipath propagation, the spreading gain for CCK-11 modulation is only two so that this mode degrades considerably more than all other 802.11b modes in a multipath environment, if transmission is distorted by frequency selective fading.

SUMMARY OF THE INVENTION

An improved WLAN receiver and operation method is provided that may reduce interference of the received signal particularly when 802.11b CCK-11 modulation is applied.

In one embodiment, a WLAN receiver is provided that has an interference reduction unit for reducing interchip interference in a received CCK-11 modulated signal. The interference reduction unit comprises a DFE (Decision Feedback Equalizer) unit that has a feedforward filter and a feedback filter. The feedforward filter is for reducing precursor interference in the CCK-11 modulated signal, and the feedback filter is for reducing postcursor interference in the CCK-11 modulated signal.

In another embodiment, there is provided an integrated circuit chip for use in a WLAN receiver. The integrated circuit chip has interference reduction circuitry for reducing interchip interference in a received CCK-11 modulated signal. The interference reduction circuitry comprises a DFE unit that has a feedforward filter and a feedback filter. The feedforward filter is for reducing precursor interference in the CCK-11 modulated signal, and the feedback filter is for reducing postcursor interference in the CCK-11 modulated signal.

In a further embodiment, a method of operating a WLAN receiver is provided that has a DFE unit for reducing interchip interference in a received CCK-11 modulated signal. The method comprises operating a feedforward filter of the DFE unit for reducing precursor interference in the CCK-11 modulated signal, and operating a feedback filter of the DFE unit for reducing postcursor interference in the CCK-11 modulated signal.

In yet another embodiment, a WLAN receiver is provided that has an interference reduction unit for reducing interchip interference in a received signal. The received signal is modulated using a complementary code keying technique and has a spreading gain of two. The interference reduction unit comprises a DFE (Decision Feedback Equalizer) unit that has a feedforward filter and a feedback filter. The feedforward filter is for reducing precursor interference in the received signal, and the feedback filter is for reducing postcursor interference in the received signal.

In still another embodiment, a method of operating a WLAN receiver is provided that has a DFE unit for reducing interchip interference in a received signal. The received signal is modulated using a complementary code keying technique and has a spreading gain of two. The method comprises operating a feedforward filter of the DFE unit for reducing precursor interference in the received signal, and operating a feedback filter of the DFE unit for reducing postcursor interference in the received signal.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 1:
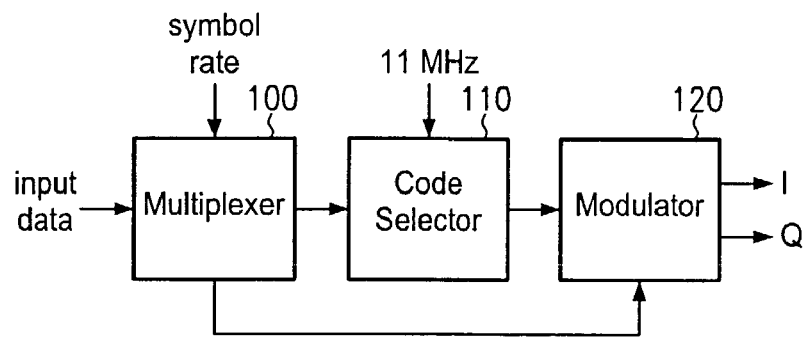
FIG. 1 illustrates a conventional CCK modulator.
Figure 2:
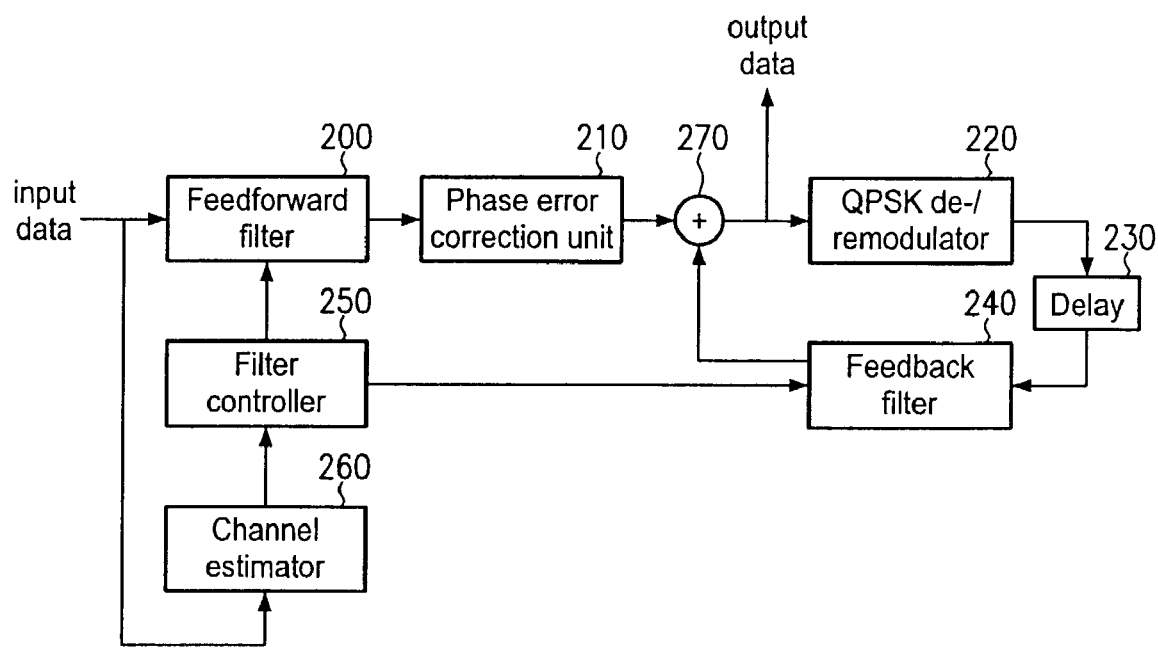
FIG. 2 is a block diagram illustrating an interference reduction unit in a WLAN receiver according to an embodiment.

Referring now to the drawings and particularly to FIG. 2 which illustrates an interference reduction unit according to an embodiment, a DFE (Decision Feedback Equalizer) is provided for reducing self interchip interference of the incoming sequence. The chip-based DFE includes a fractionally spaced feedforward filter 200 that reduces precursor interference. The feedback filter 240 of the DFE cancels out postcursor interference. Coherent reception is assured by the phase error correction unit 210.

In detail, the input data sequence is fed to the feedforward filter 200, and the output of the feedforward filter 200 is provided to the phase error correction unit 210. In the feedback part of the DFE, there is provided the feedback filter 240. The output signals of the feedback filter 240 and the phase error correction unit 210 are combined by combiner 270 to generate output data. Further, there is a QPSK demodulator/remodulator 220 for demodulating the output of combiner 270 and again remodulating the demodulated signal to adjust the data format. The remodulated demodulated data is then delayed by one chip in delay unit 230, and passed to the feedback filter 240.

The feedforward filter 200 does not only remove precursor interference from the input data but also works as a channel matched filter. For this purpose, the feedforward filter 200 receives input from filter controller 250 to adapt the filter coefficients of feedforward filter 200 to the channel on which the CCK-11 modulated signal is received. The filter controller 250 also controls the feedback filter 240.

In order to allow the filter controller 250 to adapt the filter coefficients of the feedforward filter 200 and the feedback filter 240 to the channel, it is connected to a channel estimator 260. The channel estimator 260 receives the input data sequence and estimates the discrete-time overall channel impulse response.

To understand this concept, it is assumed that $x=\{x(k)\}$ is the transmitted chip sequence having values of a QPSK constellation. The incoming discrete-time I-fold oversampled sequence z which is input to the feedforward filter 200 and channel estimator 260, can be modeled as $$z(k)=[x_I h](k)+n_I(k)$$

where $$x_I=\{0,\ldots,0,x(k),0,\ldots,0,x(k+1),\ldots\}$$

is the spread chip sequence, i.e. it has I-1 zeros inserted.

$$n_I=\{n_I(k)\}$$

is the oversampled additive noise sequence, and $$h=\{h_0(k),\ldots,h_{I-1}(k)\} k=0,\ldots,q$$

is the fractionally spaced overall channel impulse response. In the above modeling equation, the spread chip sequence is combined with the fractionally spaced overall channel impulse response by means of a discrete-time convolution.

The channel combines the effect of the analog transmit filter, the (frequency selective) multipath propagation, the receive filter, and the analog-to-digital converter, in combination with a sampler. An estimate of the fractionally spaced overall channel impulse response h is what is obtained by the channel estimator 260. Based on this estimation, the channel estimator 260 outputs a control signal to the filter controller 250, on the basis of which the filter controller 250 controls the feedforward filter 200 and the feedback filter 240. In particular, filter optimization may be based on the estimate of the channel impulse response and accomplished by a fast Cholesky factorization algorithm where both the feedforward filter and the feedback filter are computed in parallel.

It is to be noted that the DFE filter optimization performed by channel estimator 260 and filter controller 250 is done during the preamble part of the input data sequence. To better discuss the timing of the operation of the interference reduction unit shown in FIG. 2, FIG. 3 illustrates a time schedule according to an embodiment.

The input data sequence may include preambles 300, SFD (Start of Frame Delimiter) portions 305, and data headers 310. While the above mentioned standards define short as well as long preambles, the embodiment of FIG. 3 applies to long preambles, i.e. preambles of 128 symbols.

When receiving the data sequence, a preamble 300 is detected, and a timing error correction 315 is performed. Once the initial timing offset is nearly corrected, the channel estimator 260 is activated. The channel estimator 260 now operates within a time interval 320 of 35 symbols (one symbol having 11 chips in the present embodiment) to perform the estimation. Once the estimate of the channel impulse response is available at the output of the channel estimator 260, the computation of the filter coefficients starts. This is done by filter controller 250 within time interval 325 of 21 symbols. In the present embodiment, 21 symbols correspond to 462 cycles of a 22 MHz clock.

Figure 3:
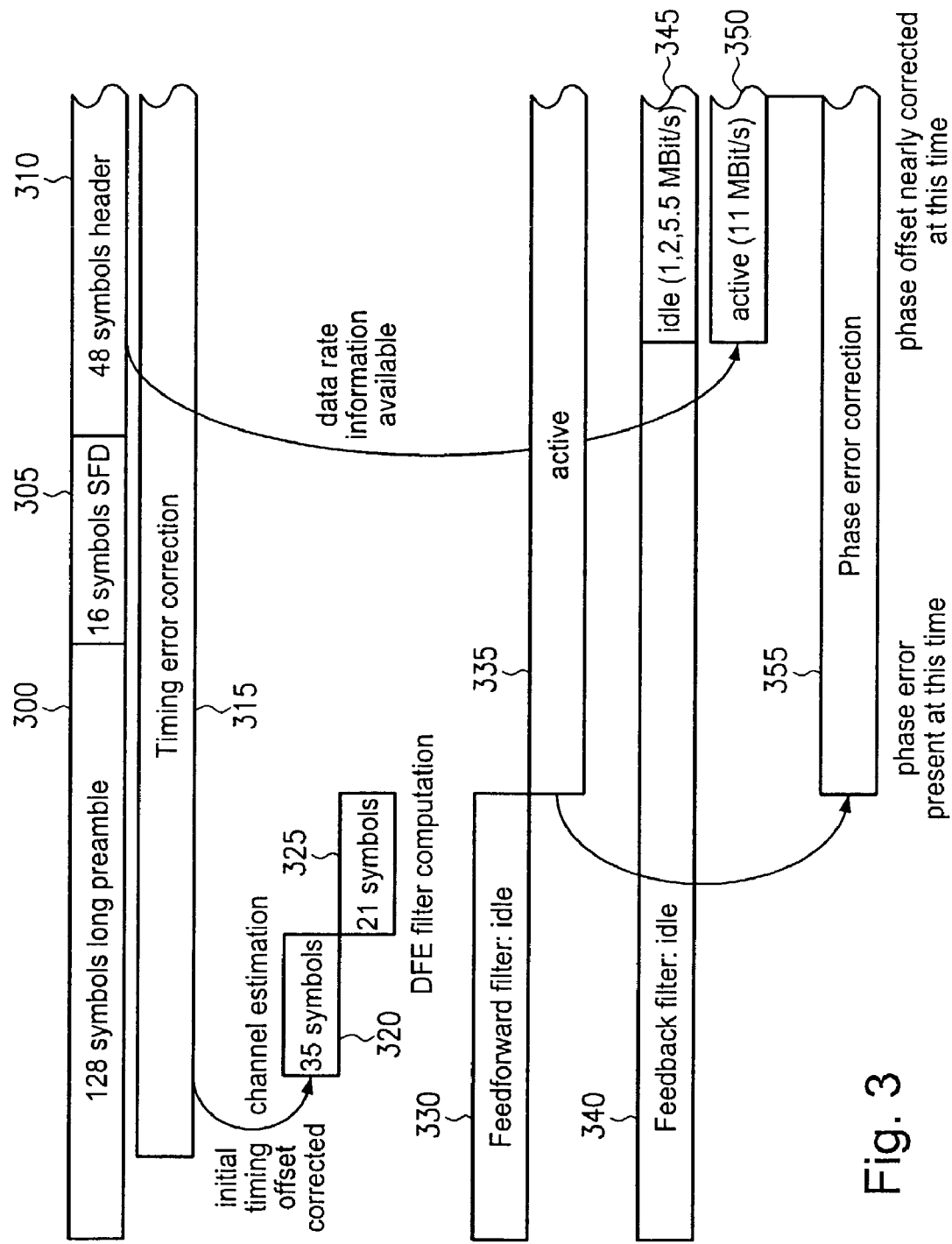
FIG. 3 is a timing chart illustrating the operation of the interference reduction unit of FIG. 2.

As indicated in FIG. 3 by reference number 330, the feedforward filter 200 works in an idle mode up to the time when the filter coefficient computation is finished. During this time the filter just delays the incoming data according to the processing delay. Once the filter coefficients are made available by filter controller 250, the feedforward filter 200 performs FIR (Finite Impulse Response) type filtering of the incoming data based on the current feedforward filter coefficients. That is, the feedforward filter 200 is activated (reference number 335) at the end of time interval 325, i.e. still within the preamble 300. The feedforward filter 200 falls back into its idle mode once the complete 802.11b frame has been received.

It is to be noted that switching the feedforward filter 200 from idle to the active mode causes a phase hop of the output signal of the feedforward filter 200. The phase offset is in general not correct at this time since the time span of the filter computation is too long with respect to the residual frequency offset. For this reason, the phase error correction unit 210 begins to operate in the time interval 355, i.e. when the feedforward filter 200 is activated. The phase error correction unit 210 assures a corrected phase at the beginning of the header 310 which is the time when coherent reception starts.

As apparent from FIG. 3, also the feedback filter 240 is in an idle mode 340 at the beginning of each frame. The feedback filter 240 is activated once rate information is available and only if the rate is determined to be 11 Mbps. That is, if the incoming data sequence is rated at 11 Mbps, the feedback filter 240 is activated for the time interval 350 until a complete 802.11b frame has been received. If a different data rate is determined, e.g. 1, 2 or 5.5 Mbps, the feedback filter 240 is kept in its idle mode.

As described above, the present embodiment employs 128 symbols long preambles 300. In another embodiment, short preambles are used. In this embodiment, only a scaled channel matched filter is computed and the feedback filter 240 remains idle.

Figure 4:
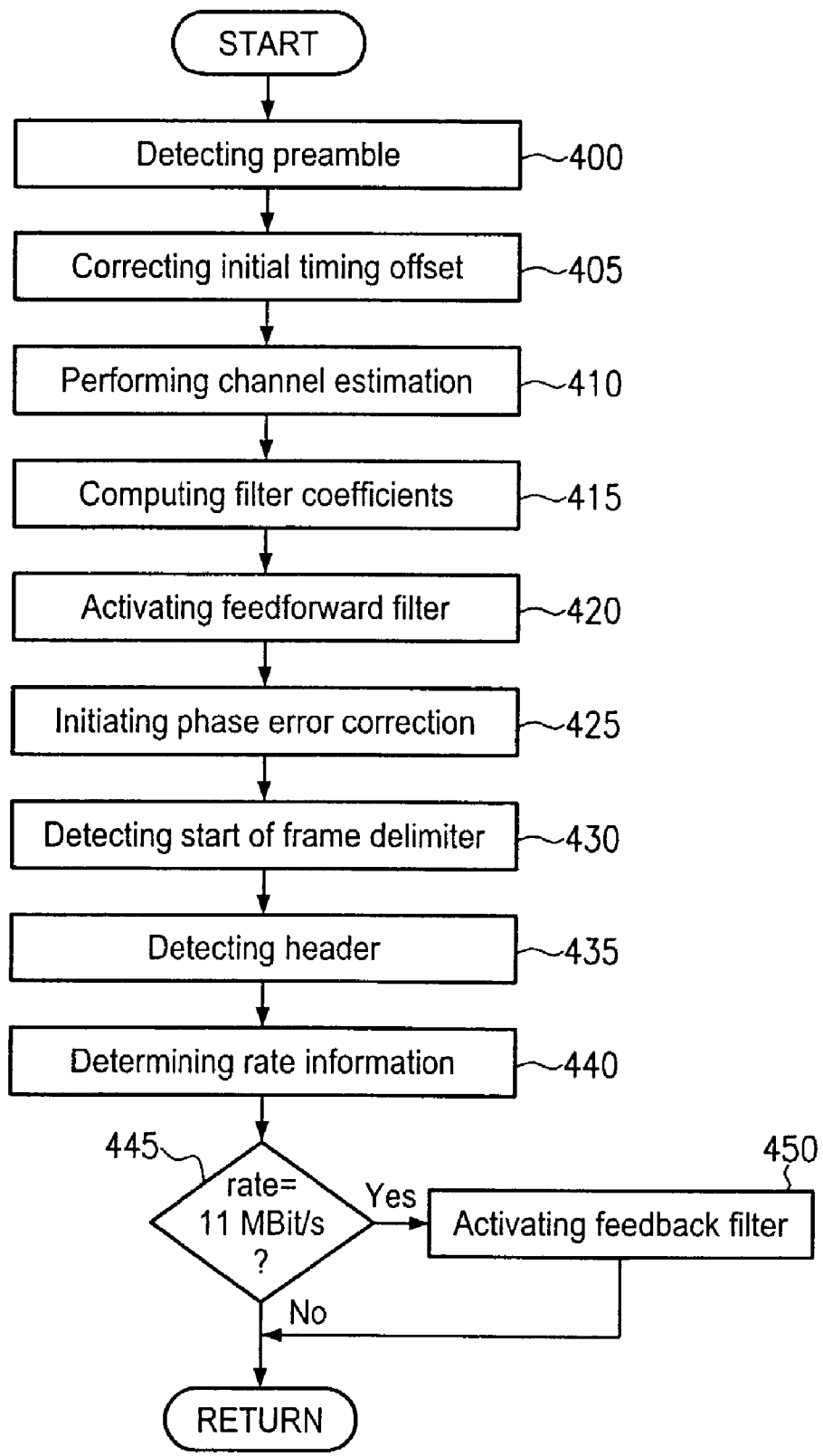
FIG. 4 is a flowchart illustrating the process of reducing interchip interference in a received CCK-11 modulated signal according to an embodiment.

Turning now to FIG. 4, a flowchart is shown for illustrating the process of the interference reduction unit of FIG. 2. In step 400, a preamble 300 of the input data sequence is detected. A timing error correction 315 is then performed in step 405 to correct an initial timing offset. The channel estimator 260 is then initiated to perform channel estimation in step 410. Based on the result of the channel estimation, the filter controller 250 computes filter coefficients in step 415. Once the filter coefficients are computed, the feedforward filter 200 and the phase error correction unit 210 are activated in steps 420 and 425, respectively. As mentioned above, this is still done within the preamble time interval.

The preamble 300 is followed by, e.g., 16 symbols representing the start of frame delimiter SFD 305. Once the SFD symbols are detected in step 430, the header 310 is detected in step 435. Then, the rate information is determined in step 440 and it is checked in step 445 whether the data rate is 11 Mbps. If so, the feedback filter 240 is activated in step 450.

As apparent from the description of the above embodiments, a chip-based decision feedback equalizer is provided that reduces the interference part of the received signal in case of 802.11b CCK-11 modulation. Computer simulations reveal that the packet error rate could be reduced from 25% to 4% at a chip signal to noise ratio of about 25 dB (including frequency offset and timing drift) on a UMTS-A-6-tap indoor channel. This clearly shows that the embodiments are effective in reducing self interchip interference of the incoming sequence.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein.

Accordingly, it is to be understood that the invention is not to be limited by the specific illustrative embodiments, but only by the scope of the appended claims.

What is claimed is:

1. A WLAN (Wireless Local Area Network) receiver having an interference reduction unit for reducing interchip interference in a received CCK-11 (Complementary Code Keying at 11 Mbps) modulated signal, said interference reduction unit comprising:
   a DFE (Decision Feedback Equalizer) unit having a feedforward filter and a feedback filter, said feedforward filter configured to reduce precursor interference in the CCK-11 modulated signal, said feedback filter configured to reduce postcursor interference in the CCK-11 modulated signal; and
   a phase error correction unit for correcting a phase offset in the received CCK-11 modulated signal to assure coherent payload reception, wherein said phase error correction unit is connected to receive an output signal of said feedforward filter.

2. The WLAN receiver of claim 1, wherein said interference reduction unit is arranged to change the operational mode of said feedback filter from an idle mode to an active mode when data rate information is available in the received signal.

3. The WLAN receiver of claim 2, wherein said interference reduction unit is arranged to activate said feedback filter only if said data rate information indicates a data rate of 11 Mbps.

4. The WLAN receiver of claim 2, wherein said interference reduction unit is arranged to activate said feedback filter during a header in the received signal.

5. The WLAN receiver of claim 2, wherein said interference reduction unit is arranged to activate said feedback filter only if the received signal includes long preambles of 128 symbols.

6. The WLAN receiver of claim 1, wherein said feedforward filter is a fractionally spaced feedforward filter.

7. The WLAN receiver of claim 1, wherein said feedforward filter is arranged to perform a filter function that is matched to the channel on which the CCK-11 modulated signal is received.

8. The WLAN receiver of claim 1, wherein said phase error correction unit is connected to be activated when said feedforward filter changes its operational mode from an idle mode to an active mode.

9. The WLAN receiver of claim 8, wherein said interference reduction unit is arranged to activate said phase error correction unit during a preamble in the received signal.

10. The WLAN receiver of claim 1, wherein said interference reduction unit further comprises:
    a combiner for combining an output signal of said phase error correction unit and an output signal of said feedback filter.

11. The WLAN receiver of claim 10, wherein said interference reduction unit further comprises:
    a QPSK (Quadrature Phase Shift Keying) demodulator/remodulator connected to receive the combined signal from said combiner.

12. The WLAN receiver of claim 11, wherein said interference reduction unit further comprises:
    a delay unit connected to receive a signal from said QPSK demodulator/remodulator and output the delayed signal to said feedback filter.

13. The WLAN receiver of claim 12, wherein said delay unit is arranged to apply a delay of one chip to the signal received from said QPSK demodulator/remodulator.

14. The WLAN receiver of claim 1, wherein said interference reduction unit further comprises:
    a filter optimization unit comprising a filter controller for computing filter coefficients adapted to the channel on which the CCK-11 modulated signal is received.

15. The WLAN receiver of claim 14, wherein said filter controller is arranged to compute said filter coefficients during a preamble in the received signal.

16. The WLAN receiver of claim 14, wherein said filter coefficients are feedforward filter coefficients used for controlling said feedforward filter.

17. The WLAN receiver of claim 16, wherein said filter optimization unit is connected to said feedforward filter to change the operational mode of said feedforward filter from an idle mode to an active mode when computation of said filter coefficients is finished.

18. The WLAN receiver of claim 17, wherein said filter optimization unit is arranged for triggering a phase error correction when activating said feedforward filter.

19. The WLAN receiver of claim 14, wherein said filter coefficients are feedback filter coefficients used for controlling said feedback filter.

20. The WLAN receiver of claim 14, wherein said filter coefficients are used for controlling said feedforward filter as well as said feedback filter.

21. The WLAN receiver of claim 14, wherein:
said filter optimization unit further comprises a channel estimator for estimating a property of the channel on which the CCK-11 modulated signal is received; and
said filter controller is arranged to adapt said filter coefficients to said estimated property.

22. The WLAN receiver of claim 21, wherein said property is the discrete time overall channel impulse response.

23. The WLAN receiver of claim 21, wherein said channel estimator is arranged to estimate said property during a preamble in the received signal.

24. The WLAN receiver of claim 23, wherein said preamble is a long preamble of 128 symbols.

25. The WLAN receiver of claim 23, wherein said channel estimator is arranged for starting the estimation process when an initial timing offset in the CCK-11 modulated signal has been corrected.

26. The WLAN receiver of claim 21, wherein said channel estimator is connected to receive the CCK-11 modulated signal.

27. The WLAN receiver of claim 21, wherein:
said channel estimator and said filter controller each have assigned own predetermined time intervals for estimating the channel property and computing the filter coefficients, respectively; and
the predetermined time interval for computing the filter coefficients is attached to the predetermined time interval for estimating the channel property, with no overlap between the predetermined time intervals.

28. The WLAN receiver of claim 27, wherein:
the predetermined time interval for estimating the channel property has 35 symbols; and
the predetermined time interval for computing the filter coefficients has 21 symbols.

29. An integrated circuit chip for use in a WLAN (Wireless Local Area Network) receiver, the integrated circuit chip having interference reduction circuitry for reducing interchip interference in a received CCK-11 (Complementary Code Keying at 11 Mbps) modulated signal, said interference reduction circuitry comprising:
a DFE (Decision Feedback Equalizer) unit having a feedforward filter and a feedback filter, said feedforward filter configured to reduce precursor interference in the CCK-11 modulated signal, said feedback filter configured to reduce postcursor interference in the CCK-11 modulated signal; and
a phase error correction unit for correcting a phase offset in the received CCK-11 modulated signal to assure coherent payload reception, wherein said phase error correction unit is connected to receive an output signal of said feedforward filter.

30. A method of operating a WLAN (Wireless Local Area Network) receiver having a DFE (Decision Feedback Equalizer) unit for reducing interchip interference in a received CCK-11 (Complementary Code Keying at 11 Mbps) modulated signal, said method comprising:
operating a feedforward filter of the DFE unit for reducing precursor interference in the CCK-11 modulated signal;
operating a feedback filter of the DFE unit for reducing postcursor interference in the CCK-11 modulated signal; and
correcting a phase offset in the received CCK-11 modulated signal to assure coherent payload reception wherein said phase offset is corrected using a phase error correction unit connected to receive an output signal of said feedforward filter.

31. The method of claim 30, further comprising:
changing the operational mode of said feedback filter from an idle mode to an active mode when data rate information is available in the received signal.

32. The method of claim 31, wherein said feedback filter is activated only if said data rate information indicates a data rate of 11 Mbps.

33. The method of claim 31, wherein said feedback filter is activated during a header in the received signal.

34. The method of claim 31, wherein said feedback filter is activated only if the received signal includes long preambles of 128 symbols.

35. The method of claim 30, further comprising:
operating said feedforward filter to perform a filter function that is matched to the channel on which the CCK-11 modulated signal is received.

36. The method of claim 30, wherein said phase error correction is activated when said feedforward filter changes its operational mode from an idle mode to an active mode.

37. The method of claim 36, wherein said phase error correction is activated during a preamble in the received signal.

38. The method of claim 30, further comprising:
computing filter coefficients adapted to the channel on which the CCK-11 modulated signal is received.

39. The method of claim 38, wherein said filter coefficients are computed during a preamble in the received signal.

40. The method of claim 38, further comprising:
controlling said feedforward filter based on said filter coefficients.

41. The method of claim 40, further comprising:
changing the operational mode of said feedforward filter from an idle mode to an active mode when computation of said filter coefficients is finished.

42. The method of claim 41, further comprising:
triggering a phase error correction when activating said feedforward filter.

43. The method of claim 38, further comprising:
controlling said feedback filter based on said filter coefficients.

44. The method of claim 38, further comprising:
controlling said feedforward filter as well as said feedback filter based on said filter coefficients.

45. The method of claim 38, further comprising: estimating a property of the channel on which the CCK-11 modulated signal is received; and
adapting said filter coefficients to said estimated property.

46. The method of claim 45, wherein said property is the discrete time overall channel impulse response.

47. The method of claim 45, wherein said estimation is performed during a preamble in the received signal.

48. The method of claim 47, wherein said preamble is a long preamble of 128 symbols.

49. The method of claim 47, wherein said estimation is started when an initial timing offset in the CCK-11 modulated signal has been corrected.

50. The method of claim 45, wherein:
said estimation and said computation are performed in respective predetermined time intervals; and the time interval for computing the filter coefficients is attached to the predetermined time interval for estimating the channel property, with no overlap between the predetermined time intervals.

51. The method of claim 50, wherein:

the predetermined time interval for estimating the channel property has 35 symbols; and the predetermined time interval for computing the filter coefficients has 21 symbols.

52. A WLAN (Wireless Local Area Network) receiver having an interference reduction unit for reducing interchip interference in a received signal, said received signal being modulated using a complementary code keying technique and having a spreading gain of two, said interference reduction unit comprising:

a DFE (Decision Feedback Equalizer) unit having a feedforward filter and a feedback filter, said feedforward filter being for reducing precursor interference in the received signal, wherein the received signal is a CCK-11 modulated signal, said feedback filter being configured to reduce postcursor interference in the received signal; and a phase error correction unit for correcting a phase offset in the received CCK-11 modulated signal to assure coherent payload reception, wherein said phase error correction unit is connected to receive an output signal of said feedforward filter.

53. A method of operating a WLAN (Wireless Local Area Network) receiver having a DFE (Decision Feedback Equalizer) unit for reducing interchip interference in a received signal, said received signal being modulated using a complementary code keying technique and having a spreading gain of two, said method comprising:

operating a feedforward filter of the DFE unit for reducing precursor interference in the received signal, wherein the received signal is a CCK-11 modulated signal;

operating a feedback filter of the DFE unit for reducing postcursor interference in the received signal; and correcting a phase offset in the received CCK-11 modulated signal to assure coherent payload reception, wherein said phase error correction unit is connected to receive an output signal of said feedforward filter.

* * * * *